Sept. 22, 1953  G. M. BEATTY  2,652,946
CLEANOUT GATE VALVE
Filed March 20, 1950
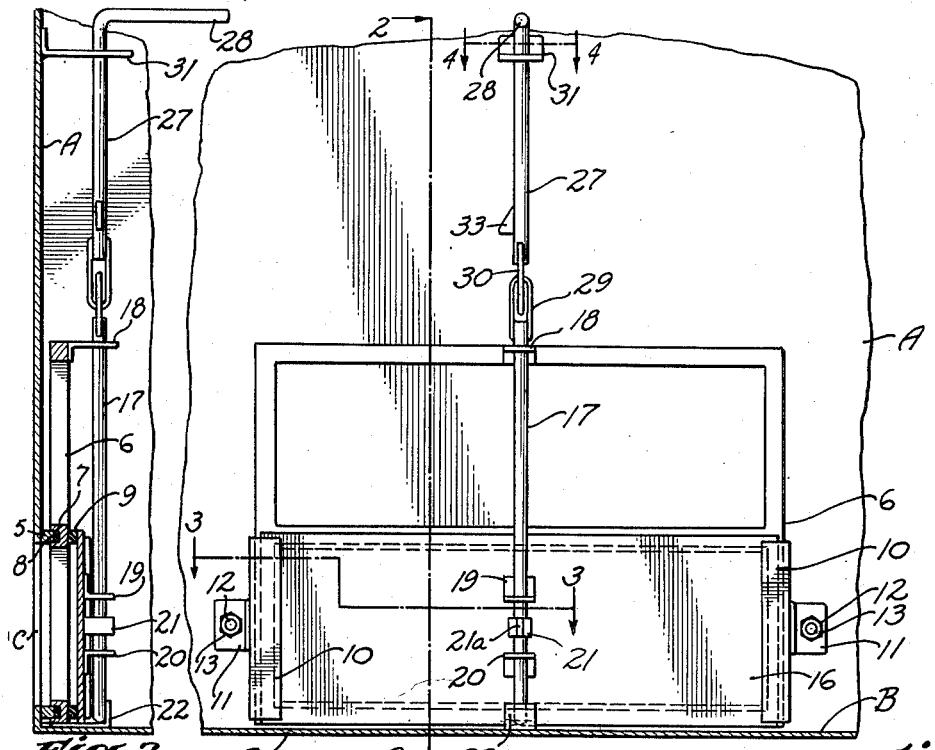
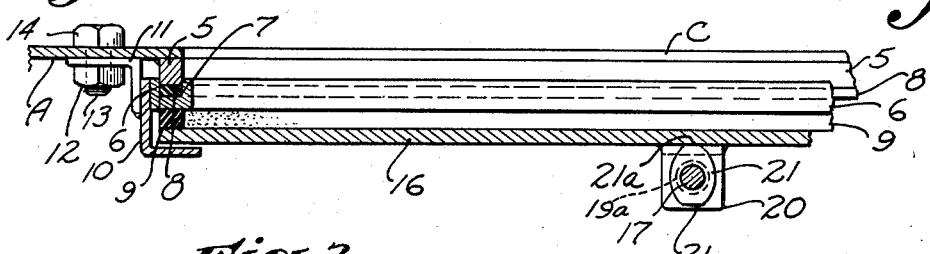
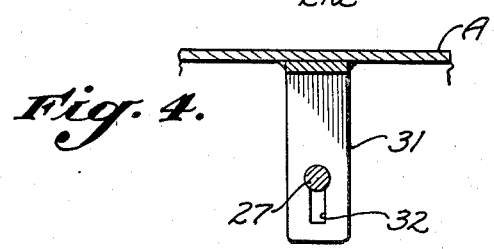
GUY M. BEATTY
INVENTOR.
BY
ATTORNEY.

Patented Sept. 22, 1953

2,652,946

UNITED STATES PATENT OFFICE 2,652,946

CLEANOUT GATE VALVE

Guy M. Beatty, Bakersfield, Calif.

Application March 20, 1950, Serial No. 150,754

10 Claims. (Cl. 220—41)

1

This invention relates to valves of the cleanout type to be installed in tanks, vats, troughs and the like to permit the same to be readily cleaned of solid accumulations, sediment, settlings, foreign matter and deposits of all kinds.

In the use of tanks, vats, troughs and the like, it is usually necessary at stated times or from time to time, to free them of solid and semi-solid accumulations which develop in the stored liquids and are deposited in the bottom and walls or represent foreign matter suspended in or entrained with liquids admitted to the tanks, etc. In oil well drilling settling tanks and troughs are used to separate from the drilling mud accumulations of sand, rock cuttings, etc. before the drilling mud is pumped back into the well. Many industrial processes such as those used in breweries, paper pulp mills, textile plants, etc. utilize tanks, vats and large as well as small receptacles which must be cleaned periodically by scraping the sides and bottoms of accumulated and adhering deposits. Such deposits and any additional solid or semi-solid foreign matter must be removed prior to steam cleaning, purging and like operations necessary to restore the receptacle to clean condition.

It is a principal object of the present invention to facilitate the cleaning of large tanks and other receptacles and especially the removal of solid and semi-solid foreign matter and deposits from such receptacles.

Another object is to devise simple and rugged apparatus for effecting the above purpose, which apparatus can be readily and quickly installed in both old and new equipment.

Another object is to provide gate valves for cleanout purposes which will make a tight seal over the cleanout opening.

Another object is to make the gate valves easy to operate and not subject to fouling by debris, settlings, deposits, and the like.

Another object is to provide for quick freeing of any valve which becomes stuck due to settlings and deposits which have built up during a long closure period.

Still another object is the provision of means for manually controlling the valve so that it can be locked in open as well as in closed position, and when in the latter position, it will make a tight seal over the cleanout opening in the wall of the tank or other receptacles.

Still other objects will be apparent from the detailed description which follows.

The invention comprises a gate valve assembly consisting essentially of a guide frame to be attached in a fluid tight manner around a cleanout opening in the wall of a tank or the like and a gate valve loosely mounted thereon for sliding movement, the valve being movable laterally against the frame when in closed position to make a tight seal over the opening. The operating means for the valve by which it is raised or lowered also effects the lateral sealing movement to lock the valve in closed position. It also includes provision for locking the valve in open position. The operating means preferably takes the form of a rod provided with a cam to force the valve laterally into sealing position. The rod is divided into two parts connected by linkage so that blows can be imparted to the valve to free it when stuck, such linkage permitting some misalignment of the rod parts when necessary without interfering with the operation of the valve. The valve can be quickly installed by merely welding a few parts in place near the cleanout opening in the tank.

In order to illustrate the invention and the manner of its use, one concrete embodiment thereof is shown in the accompanying drawings in which:

Figure 1 is a fragmentary view of the inside of a tank or the like, the bottom of which is shown in vertical section, the view showing a typical installation, the gate valve assembly appearing in front elevation with the valve in closed and sealed position over the cleanout opening in the wall of the tank;

Figure 2 is a fragmentary vertical sectional view on the line 2—2 of Figure 1 showing the operating mechanism for the valve in elevation;

Figure 3 is a partial horizontal sectional view on an enlarged scale taken on the broken line 3—3 of Figure 1; and Figure 4 is a detailed horizontal sectional view on the scale of Figure 3 and taken on the line 4—4 of Figure 1.

In the drawings A indicates the side or end wall of a tank and B the bottom of the tank. A cleanout opening C has been made in the lower part of wall A. Opening C is shown as rectangular but it may be round, oval, or of any desired shape. Surrounding opening C is a rectangular ring 5, welded or otherwise secured to wall A in a fluid tight manner.

A guide frame 6 seats over ring 5 and has a rectangular groove 7 of slightly larger section than ring 5 to receive the projecting portion of the latter against a packing 8 seated in the groove. Frame 6 has a thick packing 9 on its outer face conforming in general dimensions to packing 8. Both packings 8 and 9 are formed of synthetic rubber or other suitable material which will make a fluid tight seal and which is not adversely affected by the fluids or the solids with which the packings will be in contact. Packing 9 is by preference bonded to frame 6. Attached to the lower part of frame 6 at its sides, as by welding, are guide brackets 10 extending beyond and in spaced relation to packing 9. In addition, brackets 10 have supporting brackets 11 welded thereto which engage wall A and are secured thereto by nuts 12 on the threaded ends of studs 13 extending through holes therefor in brackets 11, heads 14 of studs 13 being welded to wall A as indicated in Figure 3. As nuts 12 are tightened when mounting frame 6 is in place, frame 6 is forced over ring 5 to cause packing 8 to be compressed and make a fluid tight seal between frame 6 and ring 5.

Mounted upon frame 6 so as to have a loose fit between packing 9 and guide rails or brackets 10 is slidably mounted a gate valve 16 of a size and shape to close and seal opening C. Movement of valve 16 is effected by a rod 17 which extends through an opening in bracket 18 attached to the upper portion of frame 6 (Figures 1 and 2) and through and beyond spaced brackets 19 and 20. The openings in brackets 19 and 20 (see broken outline in Figure 3) are large to allow side movement of rod 17, these brackets serving largely as stops for a cam member 21 fixedly attached to rod 17 between brackets 19 and 20. When valve 16 and rod 17 are in their lowermost positions (Figures 1 and 2) the lower end of rod 17 is engaged by a keeper bracket 22 attached to frame 6. Cam 21 has flats 21a at its two points of greatest projection. By rotating rod 17 in either direction to bring either projection and its flat 21a into contact with valve 16 (as in Figures 1, 2 and 3), valve 16 is forced by the cam laterally into sealing contact with packing 9 on frame 6 so as to close and seal the lower portion of frame 6 and opening C, since rod 17 is rigidly held by brackets 18 and 22 on frame 6 against movement away from frame 6.

By rotating rod 17 to bring a low projection of cam 21 opposite frame 6 there is no contact between cam 21 and valve 16, and the latter is loose in guide brackets 10. Lifting rod 17 will then bring cam 21 against stop bracket 19 and the valve can be raised to open position.

Rod 17 has an extension 27 provided with a handle 28, the two rod sections being connected by links 29 and 30. Extension 27 is slidable vertically through an opening in a guide bracket 31, welded or otherwise attached to wall A above bracket 18 on frame 6. Exact alignment of rod parts 17 and 27 is not required by reason of the linkage connection at 29, 30. The relative vertical movement permitted by the linkage 29, 30 as well as by the spacing between cam 21 and stop brackets 19 and 20 enables an operator to impart blows to valve 16 to dislodge it when stuck. A slot 32 in bracket 31 provides passage of a key 33 on rod 27 to pass through and above the bracket whereupon a slight rotation will cause the flat of the key to rest upon the bracket and hold valve 16 in open position. Reverse rotation of rod 27 to bring key 33 in line with slot 32 will permit valve 16 to be lowered to closed position.

The valve assembly of the present invention is readily installed by the use of welding equipment. Ring 5 is first welded around the cleanout opening C. If there is no such opening, ring 5 is welded in place at the desired location and then opening C is cut out with a cutting torch. Ring 5 seating in groove 7 in frame 6 entirely around opening C makes a very secure mounting for frame 6 and thus relieves studs 13 of much of the strain of supporting the valve assembly. After studs 13 have been positioned and welded in place, frame 6 can be placed over opening C and nuts 12 tightened to establish frame 6 in fluid tight engagement with the wall A of the tank around opening C. There remains only bracket 31 to be welded in place. It is secured to wall A above the center of frame 6 but exact alignment is not requisite to proper functioning by reason of the linkage connection 29, 30 between operating rod sections 17 and 27 which provides a loose flexible operation.

From the above it will be apparent that the cleanout valve assembly of the present invention is of simple construction which can be operated and actuated under adverse conditions without fouling of the operating parts. Once the valve has been closed and laterally moved to sealing position over the cleanout opening, it will maintain such seal indefinitely but due to its loose mounting in guide brackets 10 it can be quickly loosened if struck by blows imparted thereto by contracting and extending links 29 and 30 after handle 28 has been turned to rotate cam 21 out of locking position with its flat 21a out of contact with gate valve 6. Light blows can also be applied to valve 6 from the exterior of the tank through opening C, if needed, to break its sealing contact of valve 6 with packing ring 9, after rod 17 has been raised sufficiently to free its lower end from keeper bracket 22. The loose mounting of valve 6 permits it to be easily raised and lowered in a loose free manner. The tightening or sealing of the valve in closed position by rotating rod 17 to bring cam 21 into action is accomplished with little effort and has a considerable mechanical advantage since it utilizes the inherent flexibility of valve 6 and rod 17. Economy of installation is apparent from the fact that the maximum requirement involves the welding of two studs, a bracket and a rectangular or other shaped mounting ring to the tank and the cutting of the cleanout hole within the mounting ring.

While the invention has been herein disclosed in what is now considered to be a preferred form, it is to be understood that the invention is not limited to the specific details thereof but covers all changes, modifications, and adaptations within the scope of the appended claims.

I claim:

1. The combination with the wall of a tank, vat or the like having an opening therethrough for cleanout purposes and a ring welded around the edge of said opening, of a valve assembly comprising a frame having on one side a groove to receive said ring and packing in said groove to be compressed by said ring, means for securing said frame to said wall, a packing on the other side of said frame around said opening, guide brackets on said frame extending beyond said last named packing, a gate valve on said frame loosely and slidably mounted between said guide brackets and said last named packing, and manually operable means for moving said valve on said frame and for forcing it laterally when in closed position against said last named packing to seal said opening.

2. The combination with the wall of a tank, vat or the like having an opening therethrough for cleanout purposes, of a valve assembly therefor comprising a frame, means securing said frame in a fluid tight manner around said opening, guide brackets on said frame, a gate valve slidable on said frame in said guide brackets and having a loose fit therewith, a packing on said frame around said opening to be engaged by said valve, a rod for operating said valve, a guide bracket for said rod at the upper end of said frame, a retainer on the lower end of said frame to receive the end of said rod when said valve is over said opening, spaced guide and stop members on said valve having openings loosely receiving said rod, and a cam element fixed to said rod between said members for raising and lowering said valve, for forcing the latter laterally when in closed position to engage said packing to seal said opening, and for locking said valve in sealing position over said opening.

3. The combination with the wall of a tank, vat or the like having an opening therethrough for cleanout purposes, of a valve assembly therefor comprising a frame, means securing said frame in a fluid tight manner around said opening, guide brackets on said frame, a gate valve slidable on said frame in said guide brackets and having a loose fit therewith, a packing on said frame around said opening to be engaged by said valve, a rod for operating said valve, a guide bracket for said rod at the upper end of said frame, a retainer on the lower end of said frame to receive the end of said rod when said valve is over said opening, spaced guide and stop members on said valve having openings loosely receiving said rod, a cam element fixed to said rod between said members for raising and lowering said valve, for forcing the latter laterally when in closed position to engage said packing to seal said opening, and for locking said valve in sealing position over said opening, a handle extension for said rod, linkage between said rod and said extension whereby blows may be imparted to said valve to loosen the same when stuck, a bracket on the wall of the tank slidably receiving said handle extension, and key and slot means on said extension and on said last named bracket by which said valve may be releasably held in open position.

4. The combination with the wall of a tank, vat or the like having an opening therethrough for cleanout purposes, of a valve assembly therefor comprising a frame, means securing said frame in a fluid tight manner around said opening, guide brackets on said frame, a gate valve slidable on said frame in said guide brackets and having a loose fit therewith, a packing on said frame around said opening to be engaged by said valve, a rod for operating said valve, a guide bracket for said rod at the upper end of said frame, a retainer on the lower end of said frame to receive the end of said rod when said valve is over said opening, spaced guide and stop members on said valve having openings loosely receiving said rod, a cam element fixed to said rod between said members for raising and lowering said valve, for forcing the latter laterally when in closed position to engage said packing to seal said opening, and for locking said valve in sealing position over said opening, a handle extension for said rod axially alined therewith, and jar means interconnecting said rod and handle extension operable by said handle extension to deliver light blows to said valve through said rod to aid in loosening said valve when stuck.

5. A valve assembly for closing a cleanout opening in the wall of a tank, vat or the like, comprising a guide frame, means for securing said guide frame to said wall around said cleanout opening, a gate valve slidably but loosely mounted on said frame for movement parallel to said frame into and out of alinement with said opening and also laterally toward and from said frame, an axially and rotatably movable rod outside and parallel with the plane of said gate valve operatively connected with said valve for moving said valve into and out of alinement with said opening by axial movement, means fixed relative to said frame for axially and rotatably guiding said rod, a handle extension for said rod, jar means interconnecting said rod and said handle extension operable by said handle extension to impart blows to said valve to loosen the same, and a rigidly mounted cam on said rod engageable with said valve for forcing said valve laterally against said frame when said rod is rotated.

6. The subject matter of claim 5, wherein said jar means comprises a pair of interlinked links, one connected to the end of the rod, and the other to the end of said handle extension.

7. A valve assembly for closing a cleanout opening in the wall of a tank, vat or the like, comprising a guide frame, means for securing said guide frame to said wall around said cleanout opening, a gate valve slidably but loosely mounted on said frame for movement parallel to said frame into and out of alinement with said opening and also laterally toward and from said frame, an axially and rotatably movable rod outside and parallel with the plane of said gate valve operatively connected with said valve for moving said valve into and out of alinement with said opening by axial movement of the rod, means fixed relative to said frame for axially and rotatably guiding said rod, and a cam rigidly mounted on said rod for forcing said valve laterally against said frame when said rod is rotated.

8. A valve assembly for closing a cleanout opening in the wall of a tank, vat or the like, comprising a guide frame, means for securing said guide frame to said wall around said cleanout opening, a gate valve slidably but loosely mounted on said frame for movement parallel to said frame into and out of alinement with said opening and also laterally toward and from said frame, an axially movable rod outside of and parallel with the plane of said gate valve, means fixed relative to said frame for axially guiding and positioning said rod, spaced guide and stop members on said gate valve having guide openings receiving said rod for axial movement, and a cam on said rod between said spaced guide and stop members for forcing said valve laterally against said frame when said rod is rotated.

9. A cleanout valve assembly for tanks, vats and the like comprising a guide frame, packings on opposite sides of said frame, means for securing said frame around an opening in the wall of a tank, a gate valve slidably but loosely mounted on said frame for movement over or away from said opening, an axially movable rod and means through which said rod is engageable with said valve for moving said valve, means supporting said rod for axial movement for rotation on its longitudinal axis, a handle extension for said rod, a pair of interlinked loops, one on said handle extension and one on said rod through which blows may be imparted from said handle extension to said valve to loosen the same and through which rotative movement may be transmitted from the handle extension to said rod, and a cam rigidly mounted on said rod and engageable with said valve by rotation of said rod for forcing said valve laterally against said frame for sealing said opening.

10. A cleanout valve assembly for tanks, vats and the like comprising a guide frame, packings on opposite sides of said frame, means for securing said frame around an opening in the wall of a tank, a gate valve slidably but loosely mounted on said frame for movement over or away from said opening, an axially movable rod and means through which said rod is engageable with said valve for moving said valve, means supporting said rod for axial movement and for rotation on the longitudinal axis, a handle extension for said rod, a pair of interlinked loops one on said handle extension and one on said rod through which blows may be imparted from said handle extension to said valve to loosen the same and through which rotative movement may be transmitted from the handle extension to said rod, a cam rigidly mounted on said rod and engageable with said valve by rotation of said rod for forcing said valve laterally against said frame for sealing said opening, a bracket for supporting said handle extension having a slot, and a key on said handle extension to pass through said slot in said supporting bracket whereby said valve can be releasably locked in open position.

GUY M. BEATTY.

References Cited in the file of this patent

UNITED STATES PATENTS

| Number | Name | Date |
| --- | --- | --- |
| 461,187 | Giesler | Oct. 13, 1891 |
| 596,138 | Blanchard | Dec. 28, 1897 |
| 1,069,174 | Putzel et al. | Aug. 5, 1913 |
| 1,709,915 | Morris | Apr. 23, 1929 |
| 1,795,016 | Faber | Mar. 3, 1931 |
| 1,801,934 | Pearson | Apr. 21, 1931 |
| 2,330,220 | Kemper | Sept. 28, 1943 |
| 2,481,076 | Bryant | Sept. 6, 1949 |